United States Patent [19]
Fanshier

[11] 3,794,077
[45] Feb. 26, 1974

[54] EXCESS FLOW CHECK VALVE

[76] Inventor: Chester Fanshier, P.O. Box 1114, Bartlesville, Okla. 74003

[22] Filed: Dec. 15, 1972

[21] Appl. No.: 315,322

[52] U.S. Cl. ............... 137/513.3, 137/517, 137/541
[51] Int. Cl. ...................... F16k 17/30, F16k 15/06
[58] Field of Search 137/513.3, 517, 519, 541, 543, 137/543.13

[56] References Cited
UNITED STATES PATENTS

| | | | |
|---|---|---|---|
| 3,142,311 | 7/1964 | Lawrence | 137/517 |
| 2,569,316 | 9/1951 | Jerman | 137/517 |
| 2,591,060 | 4/1952 | Garretson | 137/513.3 |

*Primary Examiner*—William R. Cline
*Attorney, Agent, or Firm*—Head and Johnson

[57] ABSTRACT

This disclosure describes an improved valve, which may be used as a check valve, in which the flow of fluid in the direction to close the valve, is designed to operate the closure mechanism at a preselected rate of fluid flow. There is a housing having an inlet at one end and a valve seat at the second end. There is an axial support means which carries a valve stem with a valve head at one end, adapted to seal against the seat. The valve stem is urged away from the seat and against the flow by means of a spring, until the valve head is seated against the end of the support means. The cross sectional area of the support means is less than the cross sectional area of the valve head.

The valve head is of less diameter than the internal diameter of the housing which provides an annular space through which the fluid flows, and in which there is a pressure drop. Thus, the unit pressure on the leading, upstream face is higher than the unit pressure on the lower downstream face of the valve head. The upper pressure times the exposed area on the upper surface of the head provides a downward force which is balanced by the sum of the upward forces of the fluid pressure on the lower surface of the head and the spring force. As the fluid flow increases the pressure drop increases and at a selected value of fluid flow the downward force on the valve head will be sufficient to overcome the upward forces and the valve will move downward. This movement provides a space between the lower end of the support means and the upper surface of the valve head and exposes the entire upper surface of the valve head to the upstream pressure which now provides a greater downward force on the valve head, causing it to rapidly close, shutting off all fluid flow.

3 Claims, 4 Drawing Figures

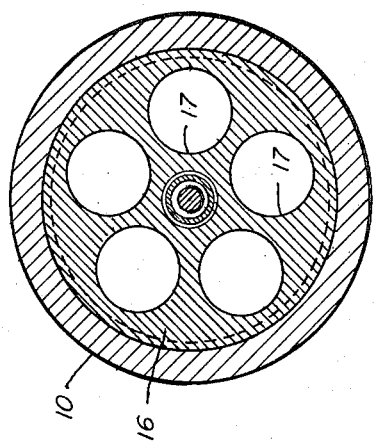
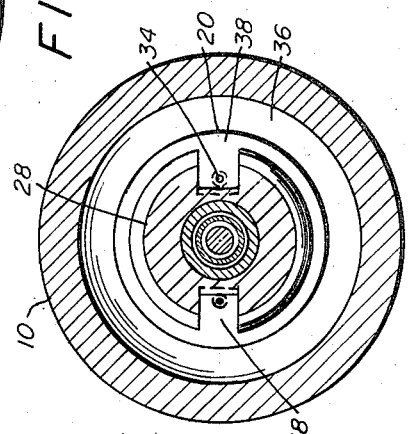
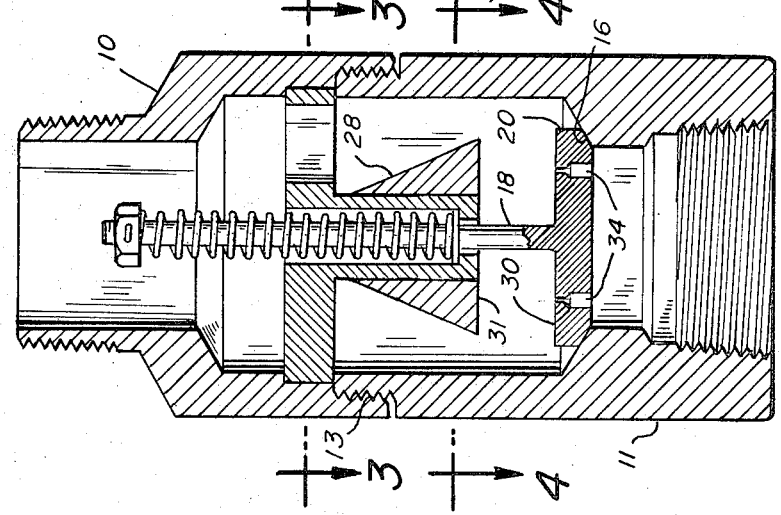
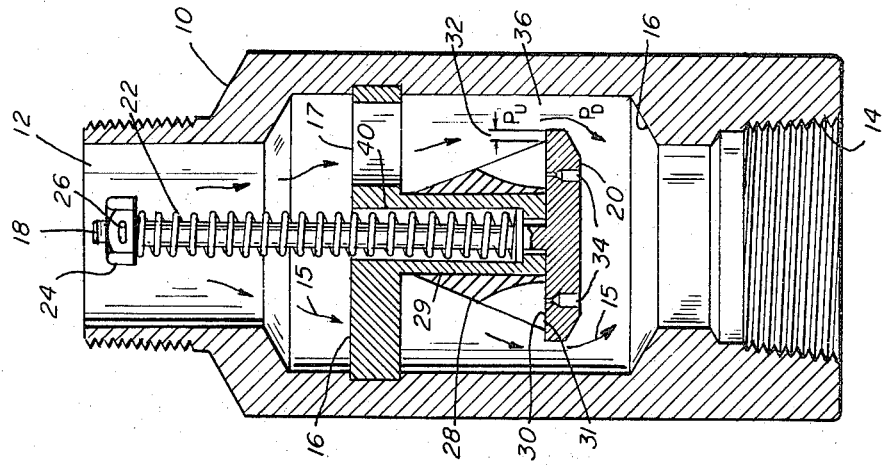

EXCESS FLOW CHECK VALVE

BACKGROUND OF THE INVENTION

This invention lies in the field of fluid control devices. More specifically, it concerns a valve means in which the closure of the valve depends upon the direction of fluid flow and also upon the magnitude of the rate of fluid flow.

In the prior art, check valves have been used in which the valve remains open for forward flow of fluid and closes immediately upon reversal of the fluid flow. There are many instances where a limited reverse flow is desired, but a reverse flow beyond a certain magnitude is undesired. This valve is adapted to that service, for which a satisfactory valve is not now available.

SUMMARY OF THE INVENTION

It is a primary object of this invention to provide a check valve which will close upon the reversal of fluid flow, and only then, upon the reversed fluid flow being of a magnitude greater than a selected value.

It is a further object of this invention to provide a valve which can be inserted in a fluid flow line and which will automatically close when the fluid flow exceeds a preselected value.

These and other objects are realized and the limitations of the prior art are overcome in this invention by providing a cylindrical valve body or housing having an inlet at one end, and a valve seat at the other. There is a support means axial of the housing, which carries a valve rod adapted to slide axially along the axis of the housing. This valve rod carries a valve head at one end adapted to seal against the valve seat. Helical spring means are provided to keep the valve open against the fluid flow through the open end, past the valve head, and through the valve seat. The diameter of the valve head is less than the inner diameter of the housing which provides a narrow annular orifice, which, under the action of fluid flow through the annular space causes a pressure drop in the fluid. This makes the pressure on the upstream (or upper) face of the valve of the valve head greater than the unit pressure on the downstream (or lower) face.

The spring urges the valve head upstream until it contacts and is contiguous with the end of the support means. This end surface is of lesser area than the upstream surface of the valve head so that only a fraction of the area of the valve head upstream is exposed to the upstream pressure of the fluid.

As the fluid flow increases the differential pressure between the upstream and the downstream pressure increases, the differential force tending to drive the valve head down, increases to the point where a fluid flow rate is present for which the downward force of the fluid pressure on the exposed upper surface of the valve head overbalances the upward force of the fluid pressure on the under surface of the valve head plus the force of the spring. When this happens the valve head moves downward. As it does, it exposes the entire upper surface of the valve head to the higher fluid pressure. This causes a much larger downward force on the valve, which causes it to move downward and seal against the valve seat. So long as the fluid pressure above the valve is higher than below the valve, the valve remains closed. However, if the fluid should change directions and flow upward through the valve the valve will immediately move upwardly under the pressure of the fluid, and of the spring, until it then seats against the support means and will then remain open until the fluid flow changes to a downward direction, and reaches the preselected magnitude.

BRIEF DESCRIPTION OF THE DRAWINGS

These and other objects of this invention and a better understanding of the principles and details of the invention will be evident from the following description taken in conjunction with the appended drawings, in which:

FIGS. 1 and 2 show a longitudinal cross section of the valve, FIG. 1 showing the valve open and FIG. 2 showing the valve closed.

FIGS. 3 and 4 are cross sections of the valve taken through the support means and at two different longitudinal positions at lines 3—3 and 4—4 of FIG. 2.

DESCRIPTION OF THE PREFERRED EMBODIMENT

Referring now to the drawings, FIG. 1 shows a longitudinal cross section through the valve. There is a cylindrical body or housing 10 having an inlet 12 and an outlet 14. As will be described later, in connection with FIG. 2, the housing is preferably made in two parts, which are identified by numerals 10 and 11 and are assembled together by means of threads 13. There is a valve seat 16 in the outlet end of the housing. This valve can be used as an overflow rate or excess flow valve, which is subjected only to fluid flow in one direction. It can also be used as a check valve which is closed by an excess flow rate in the back direction and opened by fluid flow in the forward direction.

The operation of the valve depends upon differential fluid pressures throughout the valve, and is dependent upon the direction and magnitude of fluid flow. The description can therefore be made in terms of upstream directions and downstream directions, or for convenience in accordance with the drawings, they can be described in terms of top or bottom, assuming that the fluid flow is in the direction of the arrows 15. For convenience of description the detailed operation will be described in terms of the top and bottom surfaces, for example, of the valve head.

There is a support means or mechanism 16 inside the housing which is a framework supported in the housing, and clamped between the two portions 10 and 11 of the housing by means of the threads 13. This support means 16 has a plurality of openings 17 (FIG. 3), which are large enough so that a minimum pressure drop is present across this support means. The shapes and sizes of the openings 17 can be anything desired. The support means 16 has an axial extension 29 which carries an additional cylindrical or conical tubular portion 28 which closely fits and is supported by the axial extension 29. The bottom surface of the support means is identified by numeral 31 and is important in the operation of this device.

There is a central opening 40 through the support means into which is inserted the valve stem 18 having a valve head 20 at its lower end. There is a helical spring 22 inside of the opening 40 which is locked in position by means of a threaded nut 24 on the end of the valve stem which can be held in place by means such as pin 26. In rest position, the valve is lifted by the spring to its upper position, shown in FIG. 1, where the top surface 30 of the valve head is in close contiguous sealing contact with the bottom surface 31 of the support means.

The diameter of the valve head is less than the internal diameter of the housing, leaving an annular space 36 which acts as an orifice to the flow of fluid and therefore causes a pressure drop between the top and bottom surfaces of the valve head. Thus the upper (upstream) pressure $P_U$ is greater than the lower (downstream) pressure $P_D$. There is is a differential radius between the valve head and the support means indicated by numeral 32, providing a differential exposes surface area of the top surface, which is exposed to the high pressure $P_U$, compared to the full bottom surface of the valve head. The downward force exerted on the valve head by the pressure $P_U$ against the exposed differential area constitutes a downward force. There is an upward force holding the valve in position which is equal to the sum of the pressure $P_D$ times the total bottom area of the valve head, plus the upward force due to the spring 22. However, as the flow rate increases the pressure difference between $P_U$ and $P_D$ increases to the point where the downward force is greater than the total upward force. The valve head will then move downwardly. This opens a crack between the bottom surface 31 of the support means and the upper surface 30 of the valve head. Now the total upper surface of the valve head is exposed to the higher upper pressure $P_U$ and the downward force greatly overbalances the upward force. The valve will move rapidly downwardly and the valve head 20 will seat against the valve seat 16, shutting off the flow.

The valve will remain closed so long as the flow direction is downward and the pressure on the top of the valve head is greater than below the valve head. When the direction of fluid flow through the valve reverses, the downward pressure disappears and the valve is immediately lifted by reason of the spring and the fluid flow, and stays in an opened condition until the fluid flow again reverses to the downward direction and reaches a preselected maximum.

FIG. 2 illustrates the situation when the valve is in the closed position and the valve head 20 is sealed against the valve seat 16.

There are two or more small openings 34 drilled through the valve seat. This is customary to provide a means for equalizing pressure both sides of the valve head to permit it to open under the proper condition.

FIG. 3 is a cross section taken through the valve along line 3—3, showing the multiple openings 17 through which the fluid flow is downward past the valve head.

FIG. 4 is a cross section taken near the lower end of the support means 16 along line 4—4, the tubular portion 28 being shown. This can be of a tapered shape as shown in FIG. 2 and may have one or more slots 38 cut longitudinally, or the diameter of the sloping portion 28 may be reduced by other means, so as to expose a larger selected surface area of the valve head to the upstream pressure $P_U$.

The design of the valve, so as to close at a preselected flow rate involves choosing the diameter of the valve head in relation to the internal diameter of a housing so as to provide a selected annular gap. Or the magnitude of the exposed surface are of the top of the valve head can be altered, or the valve spring constant can be changed. It will be readily understood how these three factors are involved in the selection of the flow rate which will close the valve.

While the ideal application for this valve is as a check valve, it is also possible to put two of these valves back to back in a flow line, so that fluid will be free to move in either direction through the valve but will be stopped at any time that the fluid flow rate in either direction is greater than a preselected value.

While the invention has been described with a certain degree of particularity it is manifest that many changes may be made in the details of construction and the arrangement of components. It is understood that the invention is not to be limited to the specific embodiments set forth herein by way of exemplifying the invention but the invention is to be limited only by the scope of the attached claim or claims, including the full range of equivalency to which each element or step thereof is entitled.

What is claimed:

1. A fluid flow valve adapted to close under fluid flow of a selected flow rate comprising:
   a valve housing having a flow passageway therein having an upstream end and a downstream end;
   a valve seat in said flow passageway;
   an axial support means within said body upstream of said valve seat;
   a valve head having a forward surface and a rearward surface;
   a valve rod extending from said valve head rearward face, the valve rod being reciprocally received by said support means, the valve head being thereby reciprocally positionable between a closed position in which the foward surfaces sealably engages said valve seat, and an opened position in which said valve head is displaced upstream of said valve seat;
   A shield means supported by said axial support contiguous to said valve head rearward surface when said valve head is in the opened position, the area of said shield contacting said valve head being less than the area of said valve head rearward surface whereby an unshielded area of said valve head rearward surface is impacted by fluid flow when in the closed position, such surface being substantially less than the total area of said valve head rearward surface which is impacted by fluid flow after said valve head is moved downstream away from said shield, the ratio of the valve head rearward surface unshielded area to the total area being preselected; and
   spring means urging said valve head upstream and into engagement with said shield, the force of said spring being sufficient to maintain the valve head in opened position against impingement thereon of fluid flow against the unshielded area until the preselected maximum flow rate is reached at which time the valve head moves away from said shield, and the force of said spring being substantially less than necessary to resist impingement of fluid flow at the preselected maximum rate against the unshielded valve head rearward surface.

2. A fluid flow valve according to claim 1 in which said shield has a truncated conical external configuration, the base of the conically shaped portion being smaller in diameter than the diameter of said valve head, the base of the conically shaped portion being contiguous with said valve head when the valve is in the opened position.

3. A fluid flow valve according to claim 1 wherein said shield has at least one slot in the exterior surface thereof exposing a portion of said valve head to the force of fluid flow through the valve when the valve is in opened position.

* * * * *